United States Patent [19]

Müller

[11] Patent Number: 4,620,138

[45] Date of Patent: Oct. 28, 1986

[54] DRIVE ARRANGEMENT WITH COLLECTORLESS D.C. MOTOR

[75] Inventor: Rolf Müller, St. Georgen, Fed. Rep. of Germany

[73] Assignee: Papst-Motoren GmbH & Co. KG, St. Georgen, Fed. Rep. of Germany

[21] Appl. No.: 714,220

[22] Filed: Mar. 21, 1985

[51] Int. Cl.$^4$ ............................................. H02P 6/02
[52] U.S. Cl. .................................... 318/254; 318/138; 318/439
[58] Field of Search ................... 318/138, 254 A, 254, 318/439

[56] References Cited

U.S. PATENT DOCUMENTS

| | | | |
|---|---|---|---|
| 3,584,280 | 6/1971 | Inagaki | 318/254 |
| 3,840,761 | 10/1974 | Muller | 318/254 X |
| 3,873,897 | 3/1975 | Muller | 318/138 |
| 3,916,272 | 10/1975 | Granleitner et al. | 318/254 A X |
| 3,942,083 | 3/1976 | Takahashi et al. | 318/254 A X |
| 4,051,420 | 9/1977 | Tanikoshi | 318/439 X |
| 4,070,606 | 1/1978 | Morozumi et al. | 318/138 X |
| 4,230,976 | 10/1980 | Muller | 318/138 |
| 4,240,014 | 12/1980 | Muller | 318/328 |
| 4,430,603 | 2/1984 | Muller | 318/254 |

FOREIGN PATENT DOCUMENTS 55-139098 10/1980 Japan ............................. 318/254

Primary Examiner—William M. Shoop, Jr.
Assistant Examiner—Bentsu Ro
Attorney, Agent, or Firm—Theodore J. Koss, Jr.

[57] ABSTRACT

Drive arrangement comprising a collectorless d.c. motor and a rpm-regulating arrangement. The motor comprises a permanent-magnet rotor and a stator winding arrangement. The latter is connected to a current source in dependence upon angular-position signals by means of an electrical commutation arrangement. The rpm-regulating arrangement produces a regulator signal that is a function of the deviation of the rotor's actual rpm from a desired rpm. There is provided an arrangement for modulating the regulator signal in synchronism with the rotation of the rotor. As a result of the action of the modulation arrangement, the current flowing in the stator winding arrangement between each two successive commutation operations initially builds up beginning at a point in time at least approximately coinciding with the point in time at which the commutation occurs, and the drops off again until a point in time at least approximately coinciding with the point in time at which the next-following commutation occurs.

7 Claims, 2 Drawing Figures

DRIVE ARRANGEMENT WITH COLLECTORLESS D.C. MOTOR

BACKGROUND OF THE INVENTION

1. Field of the Invention

The invention concerns a drive arrangement comprising a collectorless d.c. motor and an electrical commutation arrangement activated in dependence upon the angular position of the rotor of the motor, with steps being taken to keep commutation noise especially low.

2. Discussion of the Prior Art

Collectorless d.c. motors having an electrical commutation arrangement are well known In particular, from U.S. Pat. No. 4,230,976 of Rolf Müller there is known a drive arrangement having a collectorless d.c. motor having a permanent-magnet rotor and a stator winding arrangement. There are furthermore provided an angular-position transducer arrangement which during operation furnishes angular-position signals that are a function of the rotor's angular position, and an electrical commutation arrangement which receives the angular-position signals and selectively connects the stator winding arrangement to a current source. In the known arrangement the angular-position transducer is formed by a Hall generator. The Hall generator's operating current is modulated in synchronism with rotor rotation in such a manner that there occurs a decrease of the Hall generator's operating current when the flux density at the Hall generator is zero or almost zero. As a result the current flowing through the stator winding is substantially reduced or interrupted at about the times at which commutation is to occur.

In practice, however, for the control of the commutation of collectorless d.c. motors there are often employed angular-position transducers which permit no modulation of their operating current, in which event the technique known from the said U.S. Pat. No. 4,230,976 is accordingly ruled out to begin with. For example, Hall-IC arrangements belong to that type of angular-position transducers.

One object of the present invention is to provide a drive arrangement comprising a collectorless d.c. motor and an electrical commutation arrangement that runs particularly uniformly and in which noise attributable to the commutation is reduced in an effective way. The novel drive arrangement accordingly should be capable of being equipped with angular-position transducers of any type at all, e.g. even with Hall-IC arrangements.

SUMMARY OF THE INVENTION

In accordance with the present invention there is provided a drive arrangement having a collectorless d.c. motor comprising a permanent-magnet rotor and a stator winding arrangement. The drive arrangement comprises an angular-position transducer arrangement which during operation furnishes angular-position signals that are a function of the rotor's angular position. An electrical commutation arrangement which receives the angular-position signals and selectively connects the stator winding arrangement to a current source. There are present an rpm-measuring arrangement for generating an actual-rpm signal corresponding to the rotor's actual rpm and a desired-value transducer for furnishing a signal corresponding to the desired rotor rpm. The drive arrangement furthermore comprises an rpm-regulating arrangement having respective inputs for the actual-rpm signal and desired-rpm signal and an output, for generating a regulator signal that appears at the output of the rpm-regulating arrangement and is a function of the deviation of the actual rpm from the desired rpm of the rotor, and which controls the supply of current to the stator winding arrangement. Furthermore, the drive arrangement is equipped with an arrangement for modulating the regulator signal in synchronism with the rotor's rotation, in such a fashion that the current flowing in the stator winding arrangement between each two successive commutation operations initially builds up beginning at a point in time at least approximately coinciding with the point in time at which the commutation occurs, and then drops off again until a point in time at least approximately coinciding with the point in time at which the next-following commutation occurs.

With the inventive drive arrangement the winding's current is substantially reduced or brought to zero during the commutation phase independently of the type of angular-position transducer provided. Abrupt changes in current during the commutation phase are accordingly avoided. Noise attributable to such changes of current is prevented.

In a preferred, further embodiment of the invention the modulation arrangement is so designed that, superimposed upon the regulator signal that represents a function of the deviation of the actual rpm from the desired rpm of the rotor, there is a signal corresponding at least approximately to a rectified sinusoid whose points of inflection coincide with the points in time at which commutation occurs. The approximately sinusoidal modulation signal enforces sinusoid-like changes of current in the individual windings of the stator winding arrangement. During operation this serves the purpose of especially quiet running.

The modulation signal can, according to one's choice, be superimposed upon the actual-rpm signal that is fed to the rpm-regulating arrangement at the input side of the rpm-regulating arrangement, or be superimposed upon the desired-rpm signal that is fed to the rpm-regulating arrangement. Or else the modulation signal can, at the output side of the rpm-regulating arrangement, be superimposed upon the regulator signal that is a function of the deviation of the actual rpm from the desired rpm of the rotor. Furthermore if the rpm-regulating arrangement is of multi-stage design, then the superimposition can occur between stages. Superimposition at the input side of the rpm-regulating arrangement has the particular advantage of operating with low modulation-signal levels or with a modulation arrangement having a high internal resistance.

For forming the modulation signal, the modulation arrangement can preferably comprise means for coupling out the voltages induced in the windings of the stator winding arrangement. Such signal outcoupling is known per se, for example from FIG. 3 of U.S. Pat. No. 4,230,976, the entire disclosure of which is incorporated herein by reference. A thusly coupled-out signal is as a rule hump-shaped; and advantageously the modulation arrangement is additionally provided with a shaper circuit, preferably in the form of a filter arrangement, which converts the coupled-out modulation signal into a waveform approximating to a rectified sinusoidal voltage.

The invention is described in greater detail below with reference to preferred exemplary embodiments and with reference to the accompanying drawings.

BRIEF DESCRIPTION OF THE DRAWINGS

In FIG. 1 there is schematically indicated at 10 the permanent-magnet rotor, having north and south poles N and S, of a two-phase, two-pulse motor. The stator of the motor has two 180°-offset phase windings 11 and 12 in the form of a center-tapped winding. The phase windings 11, 12 are each activated via a controllable semiconductor element, for example the illustrated end-stage transistors 13, 14 with their respectively associated preceding-stage transistors 15, 16. In operation the stator thus produces a purely alternating field. Preferably, suitable magnetic-circuit configuration serves to provide a so-called reluctance torque. Motors of this type are known (the essay "zweipulsige kollektorlose Gleichstrommotoren" by Rolf Müller in "asr-digest for applied drive technology", volume 1-2/1977, U.S. Pat. No. 3,873,897 of Rolf Müller. and U.S. Pat. No. 3,840,761 of Benno Doemen; the contents of the two last-mentioned patents are incorporated herein by reference).

Figure 1:
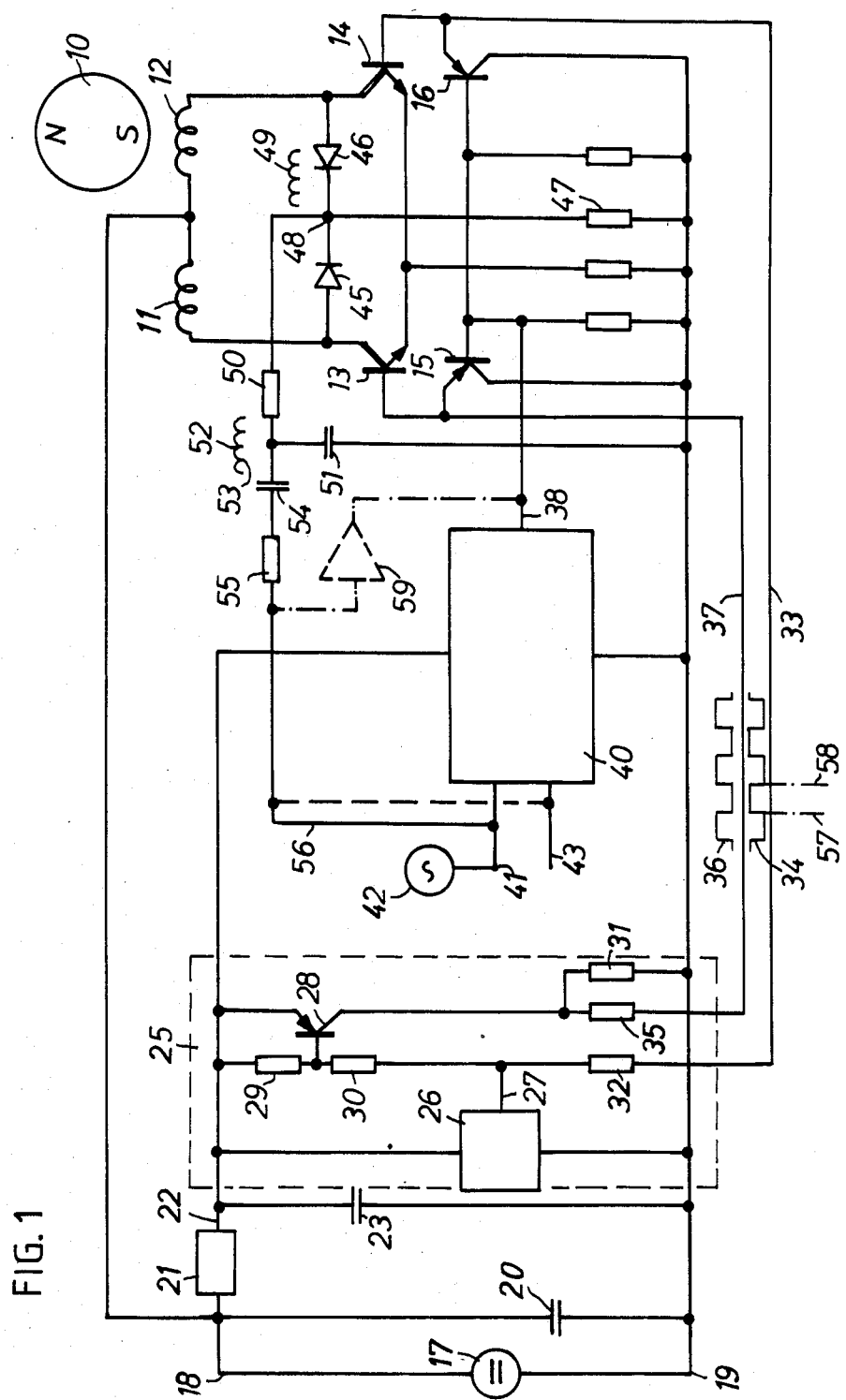
FIG. 1 depicts a schematic circuit of the essential elements of a drive arrangement according to the invention, with a two-phase, two-pulse collectorless d.c. motor

The drive arrangement depicted in FIG. 1 is supplied from a d.c. current source 17 to whose outputs 18, 19 a smoothing capacitor 20 is connected in parallel. Connected to the positive output 18 of the d.c. current source 17 is a voltage-regulating stage 21, in order to furnish a regulated voltage to the succeeding components of the drive arrangement. A further smoothing capacitor 23 is provided between the output 22 of the voltage-regulating stage 21 and the output 19, which latter is for example connected to ground.

In dependence upon the angular position of the rotor 10, an angular-position transducer arrangement 25 supplies angular-position signals for activating the commutation arrangement, essentially consisting of the transistors 13 to 16. In the illustratod embodiment the angular-position transducer arrangement comprises a Hall-IC 26 and, connected to the output 27 of the Hall-IC 26, a phase-inverting stage comprising a transistor 28 and resistors 29, 30, 31. The Hall-IC 26 is so arranged that it senses the magnetic flux produced by the permanent-magnet rotor 10. The arrangement can be implemented in the manner depicted in FIG. 1 of U.S. Pat. No. 4,430,603 of Rolf Müller, the entire disclosure of which is incorporated herein by reference, but of course for the drive arrangement according to FIG. 1 of the present application only one of the two Hall-IC's illustrated in the patent is needed. During operation a first commutation signal, schematically indicated at 34, is transmitted to a control line 33 via a resistor 32 connected to the output 27 of the Hall-IC 26. Simultaneously, a commutation signal indicated at 36 is transmitted from the output of the transistor 28, via a resistor 35, to a control line 37. The commutation signals 34, 36 are, as indicated, phase-shifted relative to each other by 180°. The bases of the end-stage transistors 13, 14 are controlled by the commutation signals 34, 36. The control lines 33, 37 are furthermore connected with the emitters of the preceding-stage transistors 15, 16. The output 38 of an rpm regulator 40 is connected to the bases of the preceding-stage transistors 15, 16. An actual-rpm signal corresponding to the actual rpm of the rotor 10 is transmitted to a first input 41 of the rpm regulator 40. This signal can for example be generated by a tachometric generator 42 coupled with the rotor 10. A desired-rpm signal is applied to a second input 43 of the rpm regulator 40, i.e. a signal which determines the desired rpm of the rotor 10. During operation there accordingly appears at the output 38 of the rpm regulator 40 a regulator signal that is a function of the deviation of the actual rpm from the desired rpm for the rotor 10, in order to control the supply of current from the d.c. current source 17 to the stator's phase windings 11, 12 in such a fashion that the actual rpm is continually maintained equal or almost equal to the desired rpm.

The voltage which during operation is induced in the phase windings 11, 12 of the stator winding arrangement is coupled out by means of diodes 45 and 46, whose anodes are connected to the terminals of the respective phase winding 11, 12 and to the collector of the associated end-stage transistor 13 or 14. The cathodes of the diodes 45, 46 are connected to each other; they are connected to ground potential via a resistor 47. As a consequence there appears at the junction 48 of the cathodes of the diodes 45, 46 a hump-shaped voltage which is schematically indicated a 49. This hump-shaped voltage has a frequency equal to twice the frequency of the commutation signals 34, 36. A filter arrangement comprising a resistor 50 and a capacitor 51 is connected to the junction 48. The resistor 50 and the capacitor 51 form a low-pass filter which convers the hump-shaped voltage 49 into a modulation signal indicated at 52 which, at least approximately, has the shape of a rectified sinusoidal voltage with its points of inflection coinciding with the points in time 57, 58 at which commutation is to occur. The modulation signal 52 is applied via a coupling capacitor 54, a coupling resistor 55 and a line 56 to the actual-value input of the rpm regulator 40 in order to be superimposed there onto the actual-rpm signal produced by the tachometric generator 42. As a result, the normal regulator signal at the output 38 of the rpm regulator 40—i.e. formed without the feeding back of the modulation signal 52—becomes modulated in synchronism with rotation of the rotor 10 in such a fashion that the current flowing in the stator winding arrangement 11, 12 between each two successive commutation operations initially builds up in a sinusoid-like way beginning at a point in time at least approximately coinciding with the point in time at which there occurs the commutation (i.e. the switch-over from the phase winding 11 to the phase winding 12, or vice versa); reaches a maximum value midway between the two successively occurring commutation operations; and then drops off again in a sinusoid-like way until a point in time at least approximately coinciding with the point in time at which there occurs the next-following commutation operation (i.e. the switch-over from the phase winding 12 to the phase winding 11, or vice versa). The current in the stator winding arrangement 11, 12 reaches a minimum value at the point in time at which commutation occurs. This manner of modulating the current serves during operation the purpose of especially quiet running. Acoustic noise during the commutation is avoided in an effective way. The sinusoidal current in the stator winding arrangement has an especially effective noise-reducing action above all in the case where the motor is of so-called asymmetric construction. Asymmetric construction is herein to be understood to mean that the rotor magnet projects out beyond the stator iron farther at one side than at the other, such as illustrated for example in FIG. 1 of the above mentioned U.S. Pat. No. 4,430,603.

If desired the line 56 can also lead to the desired-value input 43 or to the output 38 of the rpm regulator 40, in the manner indicated in FIG. 1 by broken lines or by dash-dot lines. In the last-mentioned case, an amplifier stage 59 indicated in broken lines in FIG. 1 is possibly to be inserted between the resistor 55 and the output 38.

Figure 2:
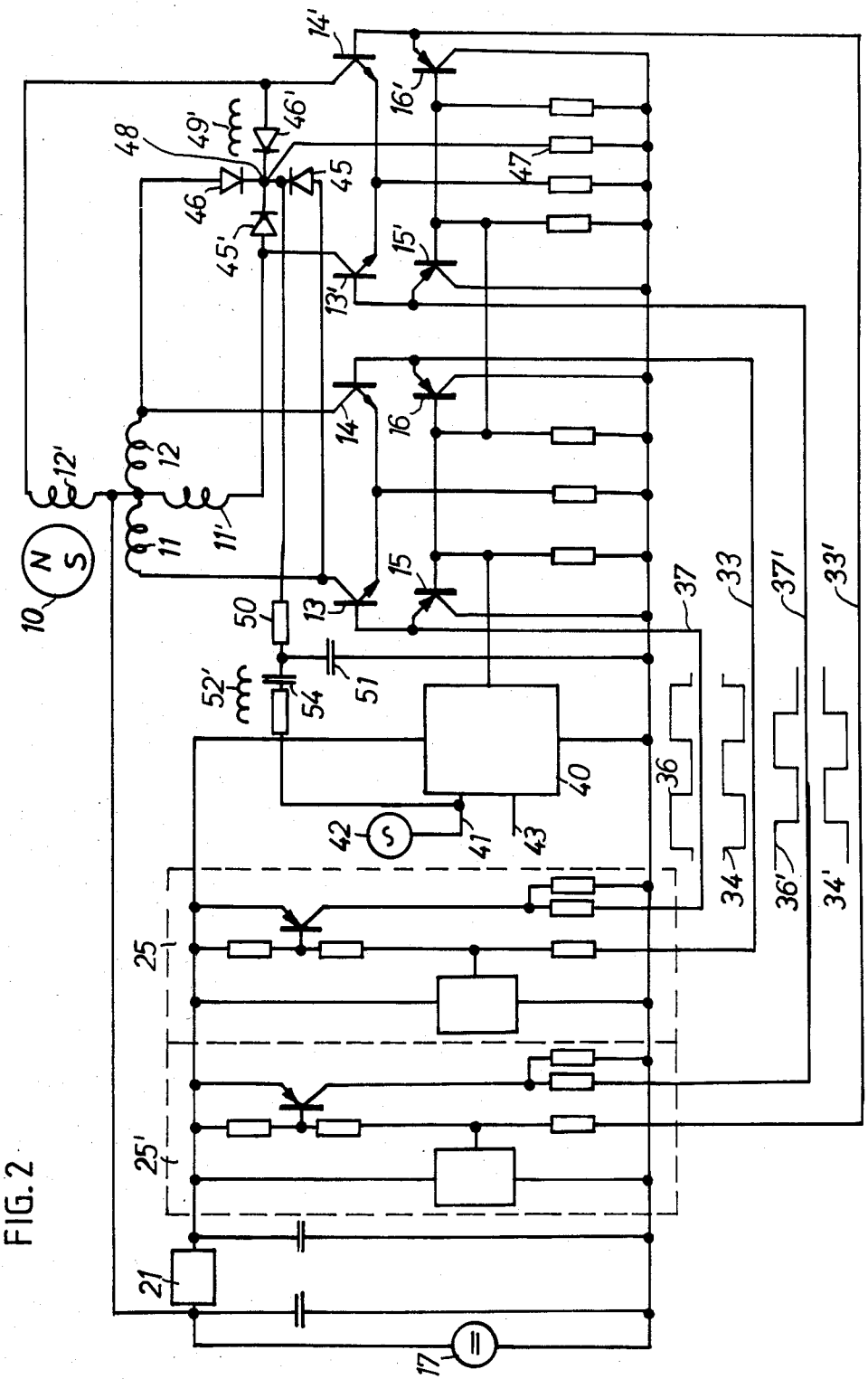
FIG. 2 is a schematic representation similar to FIG. 1, for a drive arrangement having a four-phase, four-pulse collectorless d.c. motor.

The inventive principle explained herein can also be applied to motors other than those of the two-phase, two-pulse type. FIG. 2 depicts an arrangement in accordance with the invention having a four-phase, four-pulse collectorless d.c. motor comprising four phase windings 11, 12, 11', 12' which are offset by 90°-el. and receive per electrical rotation a cyclical succession of four current pulses via respective semiconductor elements—each of which in the illustrated embodiment is again a combination of end-stage and preceding-stage transistors 13, 14, 15, 16, 13', 14', 15', 16'. To this end there are provided two angular-position transducer arrangements 25, 25' which furnish commutation signals 34, 34', 36, 36', offset one from the next by 90°-el., to four control lines 33, 33', 37, 37'. Two additional diodes 45', 46' are connected between the junction 48 and the junctions of the collectors of transistors 13', 14' with the phase windings 11', 12'. The hump-shaped voltage 49' has a frequency equal to four times the frequency of the commutation signals 34, 34', 36, 36'. In other respects the construction and manner of operation corresponds to that of the arrangement in FIG. 1.

The rpm regulator 40 can be designed in any known manner. Especially suitable are, among others, rpm regulators in accordance with U.S. Pat. No. 4,240,014 of Rolf Müller, the disclosure of which is incorporated herein by reference.

The angular-position transducer arrangements 25, or 25 and 25', can in principle be constructed in any other known manner. For example optical angular-position transducers can be provided of the type in which a light beam is interrupted with a frequency dependent upon rotor rpm.

Drive arrangements of the type set forth herein are especially suitable for, among other things, the drives of hard-disk magnetic data storages and the like.

I claim:

1. Drive arrangement having a collectorless d.c. motor comprising a permanent-magnet rotor and a stator winding arrangement; an angular-position transducer arrangement which during operation furnishes angular-position signals that are a function of the angular position of the rotor; an electrical commutation arrangement which receives the angular-position signals and selectively connects the stator winding arrangement to a current source; an rpm-measuring arrangement for generating an actual-rpm signal corresponding to the rotor's actual rpm; a desired-value signal generator for furnishing a signal corresponding to the desired rotor rpm; an rpm-regulating arrangement having respective inputs for the actual-rpm signal and desired-rpm signal and an output, for generating a regulator signal that appears at the output of the rpm-regulating arrangement and is a function of the deviation of the actual rpm from the desired rpm of the rotor, and which controls the supply of current to the stator winding arrangement; and an arrangement for modulating the regulator signal in synchronism with the rotor's rotation, in such a fashion that the current flowing in the stator winding arrangement between each two successive commutation operations initially builds up beginning at a point in time at least approximately coinciding with the point in time at which the commutation occurs, and then drops off again until a point in time at least approximately coinciding with the point in time at which the next-following commutation occurs.

2. Drive arrangement according to claim 1, the modulation arrangement being so designed that, superimposed upon the regulator signal that represents a function of the deviation of the actual rpm from the desired rpm, there is a signal corresponding at least approximately to a rectified sinusoid whose points of inflection coincide with the points in time at which commutation occurs.

3. Drive arrangement according to claim 1, the modulation arrangement producing a modulation signal that is superimposed upon the actual-rpm signal.

4. Drive arrangement according to claim 1, the modulation arrangement producing a modulation signal that is superimposed upon the desired-rpm signal.

5. Drive arrangement according to claim 1, the modulation arrangement producing a modulation signal which is superimposed upon the regulator signal that represents a function of the deviation of the actual rpm from the desired rpm of the rotor.

6. Drive arrangement according to claim 1, the stator winding arrangement being provided with means for coupling out the voltages that are induced in the windings of the stator winding arrangement and form the modulation signal.

7. Drive arrangement according to claim 6, the modulation arrangement comprising a filter arrangement for shaping the modulation signal into a wave shape approximating to a rectified sinusoid voltage.

* * * * *